United States Patent
Zhu et al.

(10) Patent No.: US 10,360,041 B2
(45) Date of Patent: Jul. 23, 2019

(54) INFORMATION PROCESSING METHOD AND FIRST ELECTRONIC DEVICE

(71) Applicant: Lenovo (Beijing) Limited, Beijing (CN)

(72) Inventors: Chong Zhu, Beijing (CN); Fenglong He, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 76 days.

(21) Appl. No.: 15/294,252

(22) Filed: Oct. 14, 2016

(65) Prior Publication Data

US 2017/0132013 A1 May 11, 2017

(30) Foreign Application Priority Data

Oct. 14, 2015 (CN) .......................... 2015 1 0663177

(51) Int. Cl.
  G06F 13/36 (2006.01)
  G06F 13/40 (2006.01)
  G06F 9/4401 (2018.01)

(52) U.S. Cl.
  CPC .......... *G06F 9/4401* (2013.01); *G06F 9/4413* (2013.01); *G06F 13/36* (2013.01); *G06F 13/4068* (2013.01)

(58) Field of Classification Search
  CPC .... G06F 13/36; G06F 13/4068; G06F 9/4401; G06F 9/4413
  See application file for complete search history.

(56) References Cited

U.S. PATENT DOCUMENTS

| 2002/0024611 | A1  | 2/2002 | Watanabe et al. |
| 2003/0140186 | A1* | 7/2003 | Lai ........................ G06F 1/1632 710/16 |
| 2010/0194667 | A1* | 8/2010 | Lee ......................... G06F 9/445 345/2.1 |
| 2011/0219148 | A1* | 9/2011 | Lee ......................... H04L 67/42 710/13 |
| 2012/0042178 | A1* | 2/2012 | Ishii ....................... G06F 1/266 713/300 |
| 2012/0171959 | A1* | 7/2012 | Cheng ................. H04M 1/7253 455/41.2 |

FOREIGN PATENT DOCUMENTS

| CN | 1815406 A | 8/2006 |
| CN | 101630852 A | 1/2010 |
| CN | 101706759 A | 5/2010 |
| CN | 102253690 A | 11/2011 |
| CN | 102854980 A | 1/2013 |
| CN | 203482194 U | 3/2014 |

* cited by examiner

*Primary Examiner* — Terrell S Johnson
(74) *Attorney, Agent, or Firm* — Kunzler Bean & Adamson

(57) ABSTRACT

A method is disclosed. The method may include detecting whether a first electronic device is in an inserted state in a second electronic device. The method may include switching the first electronic device to an "on" state in response to detecting that the first electronic device is in the inserted state in the second electronic device. In particular, the first electronic device may function as a master device and the second device may function as a slave device in response to the first electronic device switching to the "on" state. An electronic device and a program product are also disclosed.

20 Claims, 6 Drawing Sheets

INFORMATION PROCESSING METHOD AND FIRST ELECTRONIC DEVICE

FIELD

The present disclosure relates to an information processing technology in the communications field, and in particularly, to an information processing method and a first electronic device.

BACKGROUND

People are increasingly demanding portable, yet powerful, electronic devices. Smaller electronic devices may be lightweight and convenient to move. However, smaller electronic devices often include small on/off buttons. Small on/off buttons may be difficult to use and may inconvenience a user of the electronic device.

SUMMARY

A method is disclosed. The method may include detecting whether a first electronic device is in an inserted state in a second electronic device. The method may include switching the first electronic device to an "on" state in response to detecting that the first electronic device is in the inserted state in the second electronic device. In one embodiment, in response to the first electronic device switching to the "on" state, the first electronic device may function as a master device and the second electronic device may function as a slave device.

In one embodiment, detecting whether the first electronic device is in with the inserted state in the second electronic device may include detecting a signal connection with the second electronic device. In some embodiments, the method may include enabling the first electronic device to remain in a first state in response to detecting that the first electronic device is not in an inserted state in the second electronic device. The first state may include the first electronic device not being in signal connection with the second electronic device.

In one embodiment, switching the first electronic device to the "on" state in response to detecting that the first electronic device is in with the inserted state in the second electronic device may include generating a start-up command, sending the start-up command to the first electronic device, and switching a power supply of the first electronic device to a power-on state.

In some embodiments, switching the first electronic device to the "on" state in response to detecting that the first electronic device is in the inserted state in the second electronic device may include generating a power supply event, generating a start-up command in response to generating the power supply event, and switching a power supply of the first electronic device to the power-on state in response to receiving the start-up command.

In one embodiment, the method may include determining that the first electronic device is not in the "on" state. The method may include switching a transmission bus of the first electronic device. The method may include forming a first signal connection between a first component of the first electronic device and the second electronic device via the transmission bus. The method may include switching the first electronic device to the "on" state. The method may include switching the transmission bus of the first electronic device in response to the first electronic device being in the "on" state. The method may include forming a second signal connection between a second component of the first electronic device and the second electronic device. In one embodiment, the second signal connection may include a signal transmission between the first electronic device and the second electronic device.

An electronic device is disclosed. The electronic device may include a first electronic device. In one embodiment the first electronic device may include a detection unit that detects whether the first electronic device is in an inserted state in a second electronic device. The first electronic device may include a processor and a memory storing code executable by the processor. The code may include code that switches the first electronic device to an "on" state in response to the detection unit detecting that the first electronic device is in with the inserted state in the second electronic device. In one embodiment, in response to the first electronic device switching to an "on" state, the first electronic device may function as a master device and the second electronic device may function as a slave device.

In one embodiment, the code may include code that detects a signal connection with the second electronic device. In some embodiments, the code may include code that maintains the first electronic device in a first state in response to the detection unit detecting that the first electronic device is not in with the inserted state in the second electronic device. The first state may include the first electronic device not being in signal connection with the second electronic device.

In some embodiments, the code may include code that receives a start-up command sent by the second electronic device in response to the second electronic device detecting that the first electronic device is in with the inserted state in the second electronic device. The code may include code that switches a power supply of the first electronic device to the power-on state in response to the receiving module receiving the start-up command.

In one embodiment, the code may include code that generates a power supply event in response to the detection unit detecting that the first electronic device is in with the inserted state in the second electronic device. The code may include code that generates a start-up command in response to generating the power supply event. The code may include code that switches a power supply of the first electronic device to the power-on state in response to generating the start-up command.

In one embodiment, the first electronic device may include a transmission bus. The first electronic device may include a switching unit. The transmission bus and/or switching unit may switch the transmission bus in response to the first electronic device not being in the "on" state, form a first signal connection between a first component of the first electronic device and the second electronic device via the transmission bus, switch the first electronic device to the "on" state, switching the transmission bus in response to the first electronic device being in the "on" state, and form a second signal connection between a second component of the first electronic device and the second electronic device. In some embodiments, the second signal connection may include a signal transmission between the first electronic device and the second electronic device.

In one embodiment, the first electronic device may include a stick PC. In some embodiments, the first electronic device may include an electronic device smaller than the second electronic device.

A program product is disclosed. The program product may include a non-transitory computer readable storage medium that stores code executable by a processor. The executable code may include code to detect whether a first electronic device is in an inserted state in a second electronic device, switch the first electronic device to an "on" state in response to detecting that the first electronic device is in with the inserted state in the second electronic device, and operate the first electronic device as a master device and operate the second electronic device as a slave device in response to the first electronic device being switched to the "on" state.

In one embodiment, the code to detect whether the first electronic device is in with the inserted state a second electronic device may include code to perform detecting a signal connection between the first electronic device and the second electronic device.

In one embodiment, the executable code may include code to enable the first electronic device to remain in a first state in response to detecting that the first electronic device is not in with the inserted state in the second electronic device. The first state may include the first electronic device not being in signal connection with the second electronic device.

In one embodiment, the code to switch the first electronic device to the "on" state in response to detecting that the first electronic device is in with the inserted state in the second electronic device may include code to generate a start-up command, send the start-up command to the first electronic device, and switch a power supply of the first electronic device to a power-on state.

In one embodiment, the code to switch the first electronic device to the "on" state in response to detecting that the first electronic device is in with the inserted state in the second electronic device may include code to generate a power supply event, generate a start-up command in response to generating the power supply event, and switching a power supply of the first electronic device to a power-on state in response to receiving the start-up command.

In one embodiment, the executable code may include code to determine that the first electronic device is not in the "on" state, switch the transmission bus of the first electronic device, form a first signal connection between a first component of the first electronic device and the second electronic device via the transmission bus, switch the first electronic device to the "on" state, switch the transmission bus of the first electronic device in response to the first electronic device being in the "on" state, form a second signal connection between a second component of the first electronic device and the second electronic device. In one embodiment, the second signal connection may include a signal transmission between the first electronic device and the second electronic device.

BRIEF DESCRIPTION OF THE DRAWINGS

In order that the advantages of the present disclosure may be readily understood, a more particular description of the disclosure briefly described above will be rendered by reference to embodiments that are illustrated in the appended drawings. Understanding that these drawings depict only some embodiments of the disclosure and are not therefore to be considered to be limiting of its scope, the disclosure will describe and explain additional specificity and detail through the use of the accompanying drawings, in which.

DETAILED DESCRIPTION

The technical schemes in the embodiments of the present disclosure are described in conjunction with the drawings in the embodiments of the present disclosure.

Figure 1:
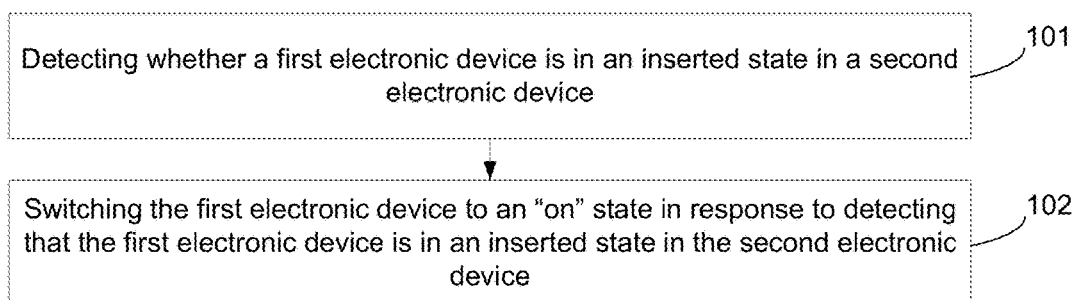
FIG. 1 shows a flow diagram of an information processing method provided in an embodiment of the present disclosure.

FIG. 1 depicts one embodiment of a method. The method may be applied to an electronic device.

Step 101 involves detecting whether a first electronic device is in an inserted state in a second electronic device. The inserted state may support a signal connection between the first and second electronic devices. The signal connection may support data transmission between the first electronic device and the second electronic device.

In one embodiment, in response to the first electronic device being in an inserted state in the second electronic device, there may be a signal connection between the first electronic device and the second electronic device. In response to the first electronic device not being in an inserted state in the second electronic device, there may be no signal connection between the first electronic device and the second electronic device. In response to the first electronic device being in an inserted state in the second electronic device, the first and second electronic devices may transmit data between the first and second electronic devices. In some embodiments, detecting whether the first electronic device is in signal connection with the second electronic device may include other methods, approaches, procedures, or the like.

Step 102 involves entering the "on" state in response to detecting that the first electronic device is in an inserted state in the second electronic device.

In one embodiment of the present disclosure, the first electronic device may enter the "on" state in response to detecting that the first electronic device is in an inserted state in the second electronic device. In response to the first electronic device being in an inserted state in the second electronic device, the second electronic device may send a start-up command to the first electronic device. The first electronic device may receive the start-up command sent by the second electronic device. In response to receiving the start-up command, the first electronic device may enter the "on" state by responding to the start-up command. In one embodiment, in response to the first electronic device being in an inserted state in the second electronic device, the first electronic device may generate a power supply event and may respond to the power supply event to generate the start-up command.

Figure 2:
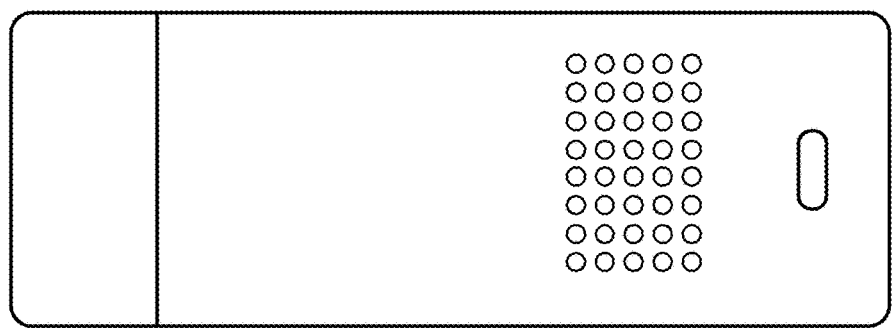
FIG. 2 shows an outline structure of a stick PC with the information processing method provided in an embodiment of the present disclosure.
Figure 3:
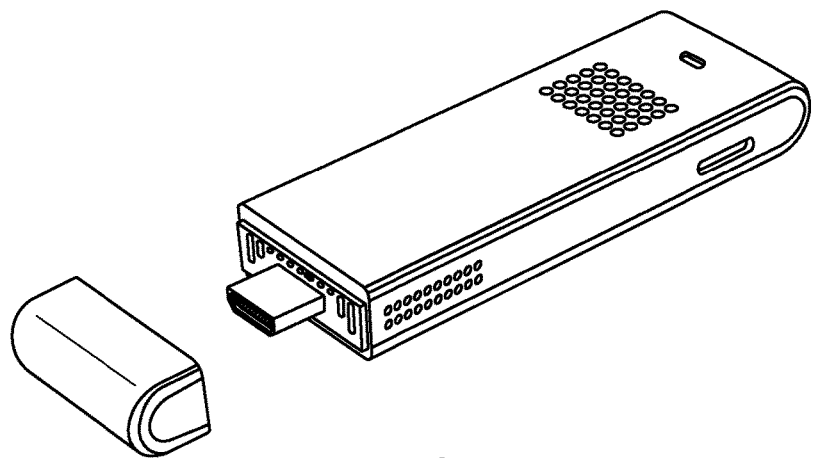
FIG. 3 shows an outline structure of another stick PC with the information processing method provided in an embodiment of the present disclosure.
Figure 4:
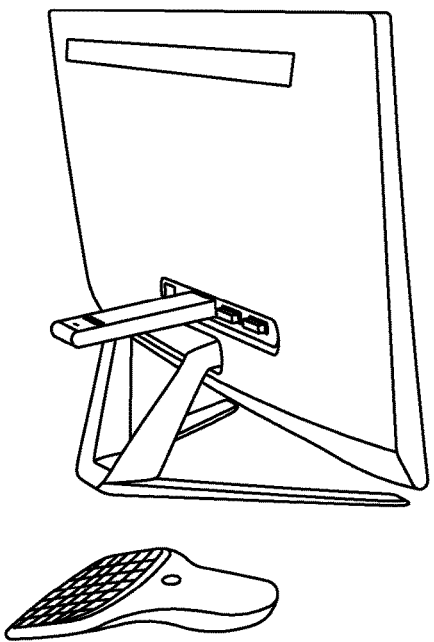
FIG. 4 shows an outline structure of the applied stick PC with the information processing method provided in an embodiment of the present disclosure.

In some embodiments, the first electronic device in the present disclosure may include various electronic devices. The electronic device may include an electronic device with a small size. In one embodiment, the first electronic device may include a stick personal computer (PC) or microdisplay. The second electronic device may include various electronic devices. In one embodiment, the second electronic device may include a device with larger size than the first electronic device. A larger sized device may include a device that a user may conveniently turn on and off. In one embodiment, a larger sized device may include a display, television, keyboard, mouse, mobile phone, laptop, or the like. The stick PC may include an independent electronic device with a small volume and without a display or on-off power. One example of a stick PC may include the stick PC IdeaCentre Stick 300 made by Lenovo. One configuration of the stick PC is provided in FIG. 2 and FIG. 3. The stick PC may adopt a Bay-Trail framework and an Atom processor (for example, an Intel Atom Z3735F processor). The stick PC may be used by directly inserting it into the HDMI interface of a TV. The stick PC may include a size of 100 mm by 38 mm by 15 mm, an internal storage, a built-in flash memory, and a SD card reader. The stick PC may support 802.11ac high speed Wi-Fi or Bluetooth 4.0, and may include an HDMI and a Micro USB 2.0 interface. The user may perform remote control through a wireless mouse or keyboard. As shown in FIG. 4, in one embodiment, the stick PC may be used by inserting it into an electronic device with a display.

In one embodiment, the steps of the method may solve the problem that the on/off button of the electronic device is small and that a user may need to press the on/off button multiple times to successfully turn on or off the power switch. In some embodiments, it may be more convenient for a user to operate the device and the method may improve the efficiency of using the smaller electronic device. In some embodiments, the method may improve the interaction between users and the electronic device.

Figure 5:
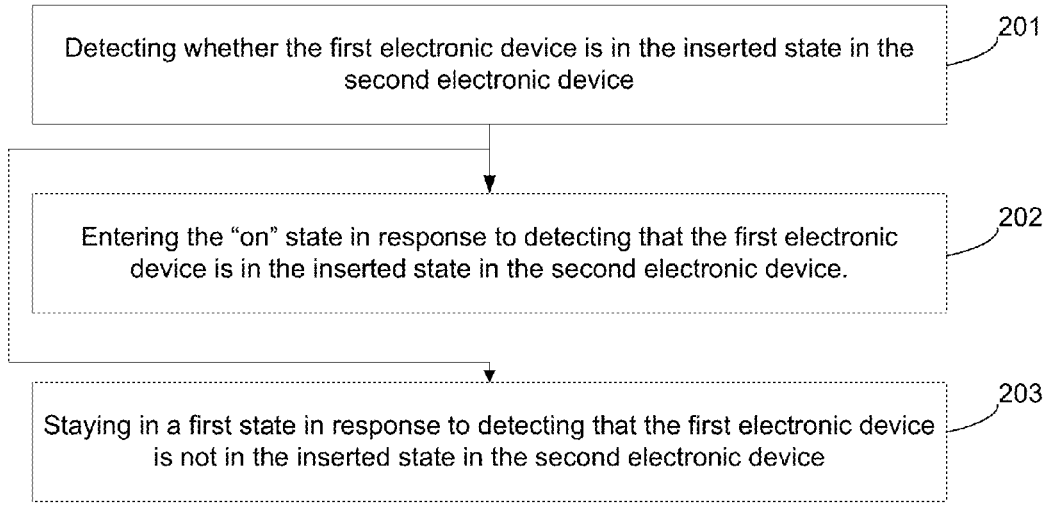
FIG. 5 shows a flow diagram of another information processing method provided in an embodiment of the present disclosure.

FIG. 5 depicts one embodiment of a method. The method may be applied to an electronic device.

Step 201 involves detecting whether the first electronic device is in the inserted state in the second electronic device. In response to detecting whether the first electronic device is in the inserted state in the second electronic device, either step 202 or step 203 may execute.

Step 202 involves entering the "on" state in response to detecting that the first electronic device is in the inserted state in the second electronic device. The inserted state may support a signal connection between the first and second electronic devices. The signal connection may support a data transmission between the first electronic device and the second electronic device.

Step 203 involves staying in a first state in response to detecting that the first electronic device is not in the inserted state in the second electronic device. The first state may include a state of the first electronic device in response to not being in the inserted state in the second electronic device. In one embodiment, the first state may include a standby state or shutdown state.

Figure 6:
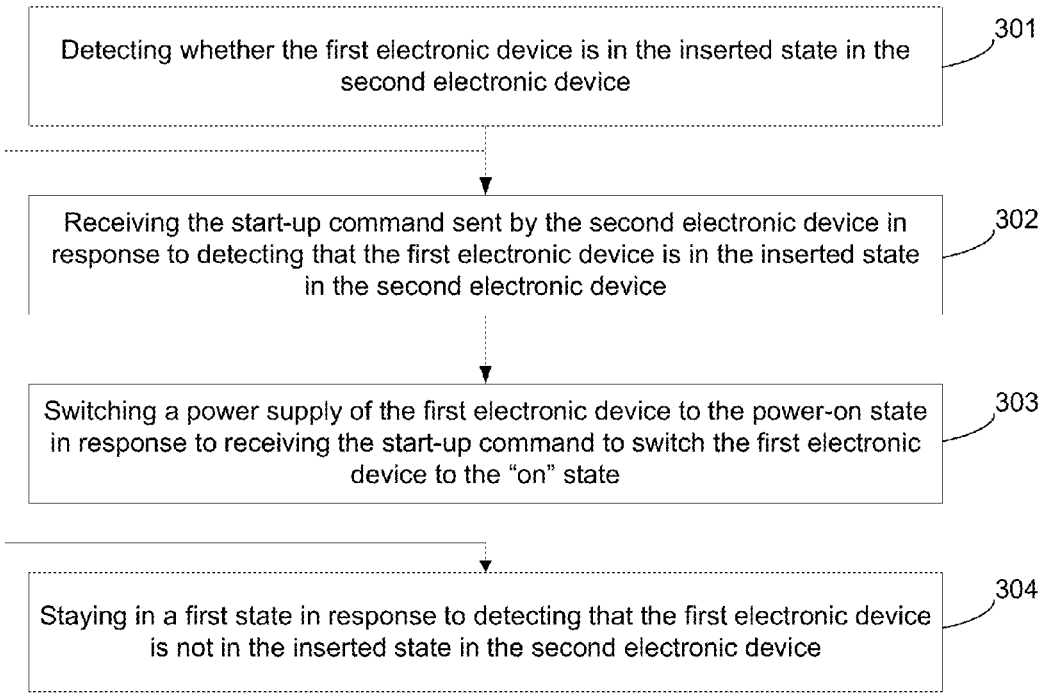
FIG. 6 shows a flow diagram of yet another information processing method provided in an embodiment of the present disclosure.

FIG. 6 depicts one embodiment of a method. The method may be applied to an electronic device.

Step 301 involves detecting whether the first electronic device is in the inserted state in the second electronic device. Steps 302, 303, or 304 may execute in response to step 301. In response to detecting that the first electronic device is in the inserted state in the second electronic device, steps 302-303 may execute. In response to detecting that the first electronic device is not in the inserted state in the second electronic device, step 304 may execute.

Step 302 involves receiving the start-up command sent by the second electronic device in response to detecting that the first electronic device is in the inserted state in the second electronic device. In some embodiments, the second device may generate the start-up command and transmit the command to the first electronic device in response to the second electronic device identifying the first electronic device. In one embodiment, the second electronic device may send the start-up command to the first electronic device in response to the first electronic device being in an inserted state in the transmission interface of the second electronic device. The transmission interface of the first electronic device may only receive the start-up command sent by the second electronic device. In response, the start-up command may instruct the first electronic device to enter the "on" state.

Step 303 involves switching a power supply of the first electronic device to the power-on state in response to receiving the start-up command. In some embodiments, the power supply of the first electronic device may switch to the power-on state in response to receiving the start-up command sent by the second electronic device. The power supply may realize the power-on state in response to the first electronic device connecting to an external power supply or in response to the first electronic device connecting to the battery of the first electronic device. The first electronic device may automatically switch to the "on" state in response to the power supply of the first electronic device switching to the power-on state.

Step 304 involves staying in a first state in response to detecting that the first electronic device is not in the inserted state in a second electronic device. The first state may include a state of the first electronic device in response to not being in the inserted state in the second electronic device. In one embodiment, the first electronic device may include a stick PC and the second electronic device may include a television. The stick PC may be inserted into the television interface if the user wishes to turn on the stick PC. The television may send the start-up command to the stick PC in response to the television recognizing that the stick PC is in an inserted state in the transmission interface of the television. The stick PC may respond to the start-up command in response to receiving the start-up command sent by the television and may supply power to the first electronic device (stick PC) via an external power supply or the battery of the stick PC. The power supply of the stick PC may switch to the power-on state. The stick PC may automatically switch to the "on" state. In response to stick PC not being in an inserted state in the second electronic device (television), there may be no signal connection between the stick PC and the television. The stick PC may stay in the first state, i.e., in a shutdown state or standby state. In some embodiments, the first state may include states other than the on state.

Figure 7:
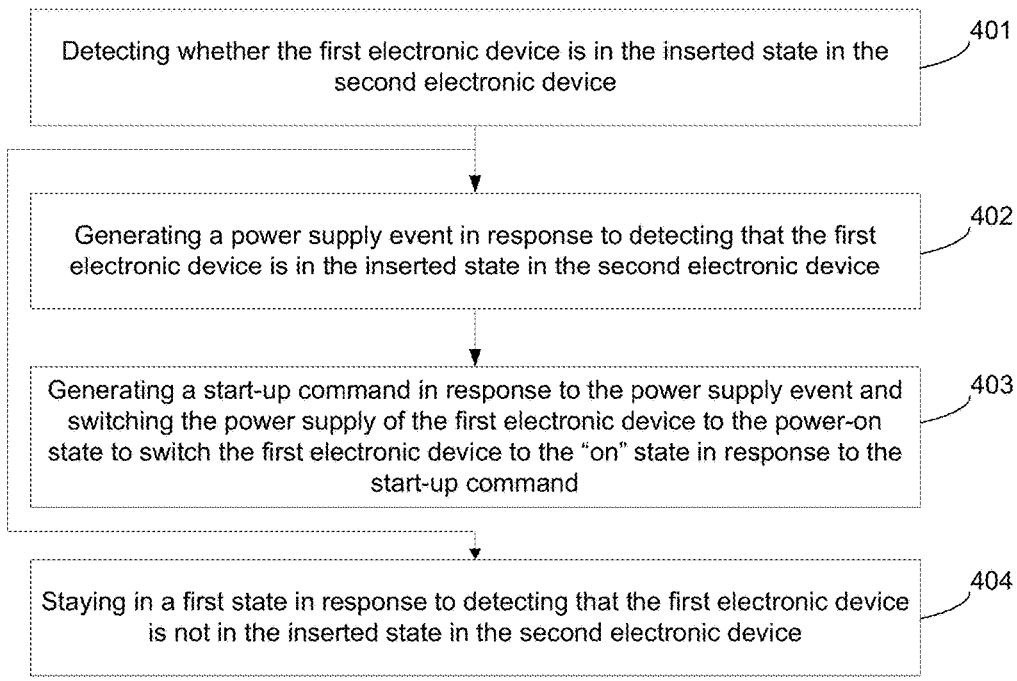
FIG. 7 shows a flow diagram of an information processing method provided in another embodiment of the present disclosure.

FIG. 7 depicts one embodiment of a method. The method may be applied to an electronic device. The method may include one or more of the following steps:

Step 401 involves detecting whether the first electronic device is in the inserted state in the second electronic device. Steps 402, 403, or 404 may execute in response to step 401. In response to detecting that the first electronic device is in the inserted state in the second electronic device, steps 402-403 may execute. In response to detecting that the first electronic device is not in the inserted state in the second electronic device, step 404 may execute.

Step 402 involves generating a power supply event. In response to detecting that the first electronic device is in an inserted state in the second electronic device, e.g., detecting that the first electronic device is in signal connection with the second electronic device, the first electronic device may generate a power supply event.

Step 403 involves generating a start-up command in response to the power supply event. In one embodiment, the first electronic device may generate a start-up command in response to the power supply event generating. The power supply of the first electronic device may switch to the power-on state. The power supply may realize the power-on state in response to the first electronic device connecting to an external power supply or in response to the first electronic device connecting to a battery of the first electronic device. The first electronic device may automatically switch to the "on" state.

Step 404 involves staying in a first state in response to detecting that the first electronic device is not in the inserted state in a second electronic device. The first state may include a state of the first electronic device in response to the first electronic device not being in the inserted state in the second electronic device. For example, the first state may include a shutdown or standby state.

Figure 8:
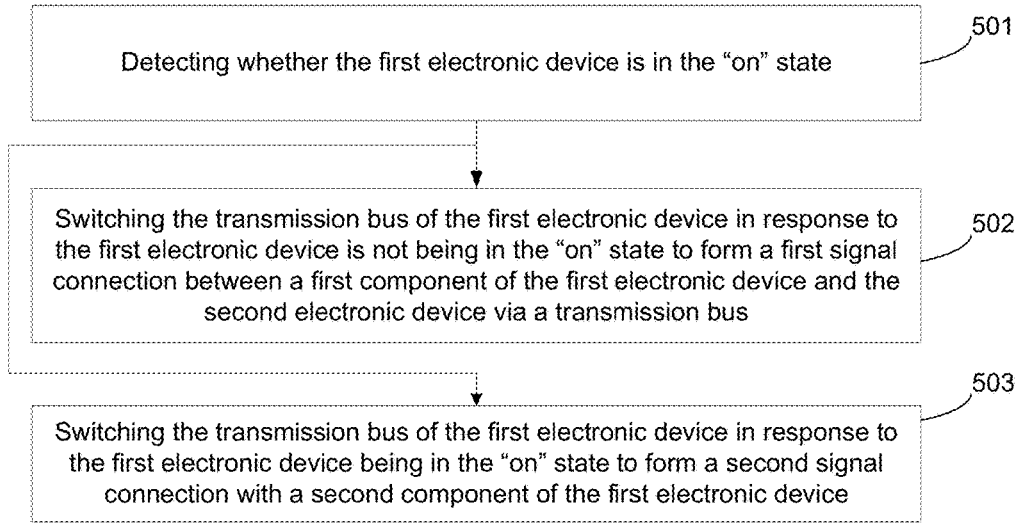
FIG. 8 shows a flow diagram of another information processing method provided in anther embodiment of the present disclosure.

FIG. 8 depicts one embodiment of a method. The method may be applied to an electronic device.

Step 501 involves detecting whether the first electronic device is in the "on" state.

Step 502 or 503 may execute after step 501. In response to detecting that the first electronic device is not in the "on" state, step 502 may execute. In response to detecting that the first electronic device is in the "on" state, then step 503 may execute.

Step 502 involves switching the transmission bus of the first electronic device in response to the first electronic device is not being in the "on" state to form a first signal connection between a first component of the first electronic device and a second electronic device via a transmission bus.

In one embodiment, the first signal connection may enable the first electronic device to enter the "on" state. The first component of the first electronic device may include a first switch of a serial input/output driver of the first electronic device. The transmission bus may include the serial input/output bus. In response to the first electronic device not being in the "on" state, a chip in the first electronic device may receive the start-up command sent by the second electronic device or may respond to the start-up event generated by the first electronic device to generate the start-up command. In response, the chip may switch the first switch of the serial input/output driver of the first electronic device. The chip may form the first signal connection between the first electronic device and the second electronic device via the serial input/output bus. In some embodiments, the first signal connection may respond to the start-up command sent by the second electronic device and may respond to the start-up event generated by the first electronic device to generate the start-up command. Responding to these events may enable the first electronic device to enter the "on" state. The transmission interface of the first electronic device may enable the first electronic device to enter the "on" state, but may not support the data transmission with the second electronic device if the first electronic device is in the "on" state.

Figure 9:
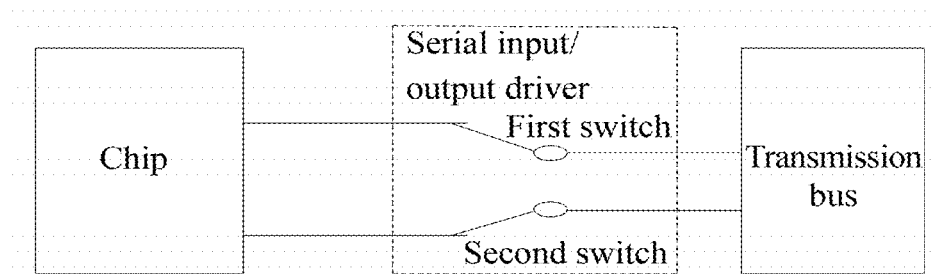
FIG. 9 shows a structure of a partial interior architecture of a first electronic device provided in an embodiment of the present disclosure.

Step 503 involves switching the transmission bus of the first electronic device in response to the first electronic device being in the "on" state to form a second signal connection with a second component of the first electronic device. The second signal connection may support signal transmission between the first electronic device and the second electronic device. In one embodiment, as shown in FIG. 9, the second component of the first electronic device may include the second switch of the serial input/output driver of the first electronic device. The transmission bus may include the serial input/output bus. In response to the first electronic device being in the "on" state, the second switch of the serial input/output driver of the first electronic device may switch to connect with the transmission bus in the first electronic device. The second switch may enable the transmission bus and chip of the first electronic device to generate a data signal connection. The chip in the first electronic device may enable the first electronic device to realize normal universal serial bus (USB) data transmission through the second switch. The transmission interface of the first electronic device may support data transmission with the second electronic device in response to the first electronic device being in the "on" state.

Figure 10:
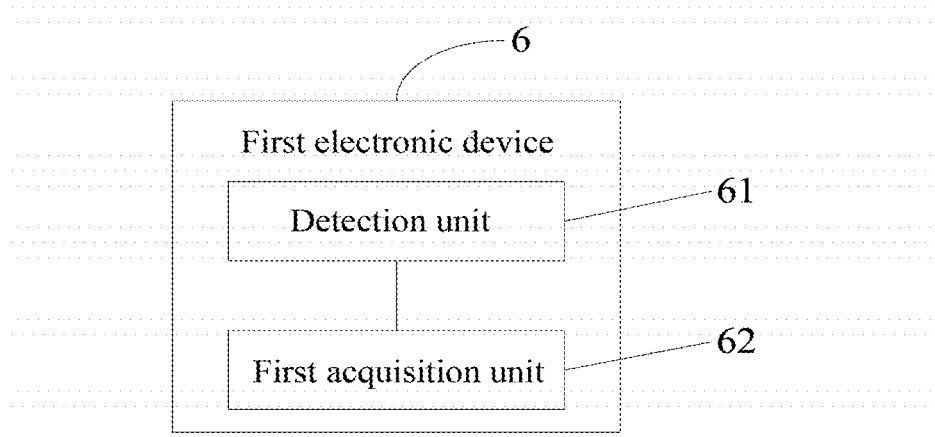
FIG. 10 shows a structure of a first electronic device provided in an embodiment of the present disclosure.

FIG. 10 depicts one embodiment of an electronic device. The electronic device may include a first electronic device. The electronic device may apply one or more methods described above. The first electronic device may include a detection unit 61 and/or a first acquisition unit 62. In one embodiment, the first electronic device may include a processor. The first electronic device may include a memory that may include code executable by the processor. In one embodiment, the code may include one or more units, such as the detection unit 61, first acquisition unit 62, or other units described below.

The detection unit 61 may detect whether the first electronic device is in the inserted state in the second electronic device. The first acquisition unit 62 may enable the first electronic device to enter an "on" state in response to the detection unit 61 detecting that the first electronic device is in the inserted state in the second electronic device. Being in an inserted state may include the first and second electronic devices being in signal connection with each other. The signal connection may support data transmission between the first electronic device and the second electronic device.

The first electronic device may include various electronic devices with smaller sizes and the second electronic device may include various electronic devices with larger sizes as explained above.

The first electronic device, in one embodiment of the present disclosure, may detect whether the first electronic device is in the inserted state in the second electronic device. In response to the first electronic device being in the inserted state in the second electronic device, the first electronic device may enter the "on" state. In one embodiment, the first electronic device may enter the "on" state automatically.

Figure 11:
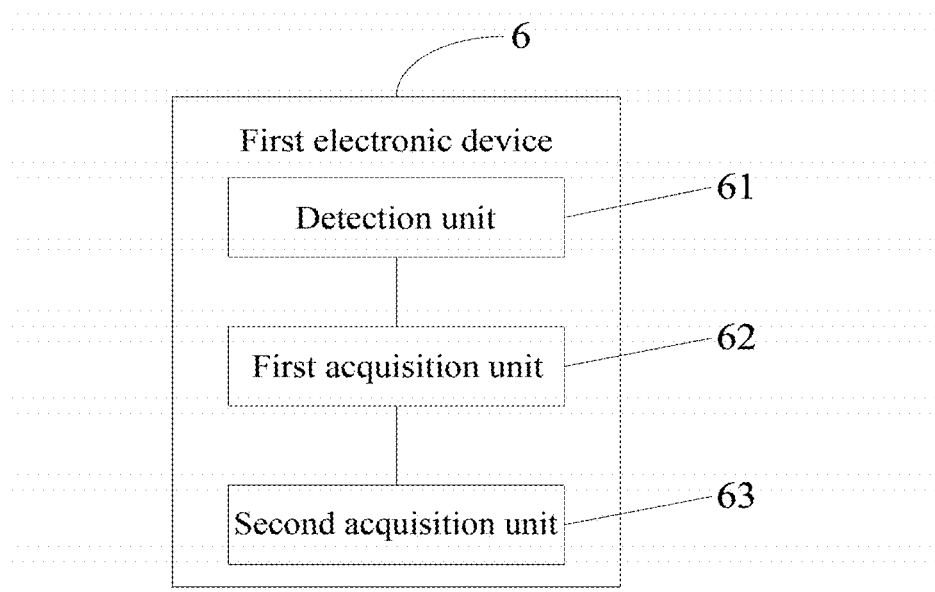
FIG. 11 shows a structure of another first electronic device provided in an embodiment of the present disclosure.

FIG. 11 depicts one embodiment of an electronic device. The electronic device may include a first electronic device.

The first electronic device may include a second acquisition unit 63. The electronic device may include the detection unit 61 and first acquisition unit 62 described above.

Figures 12, 13:
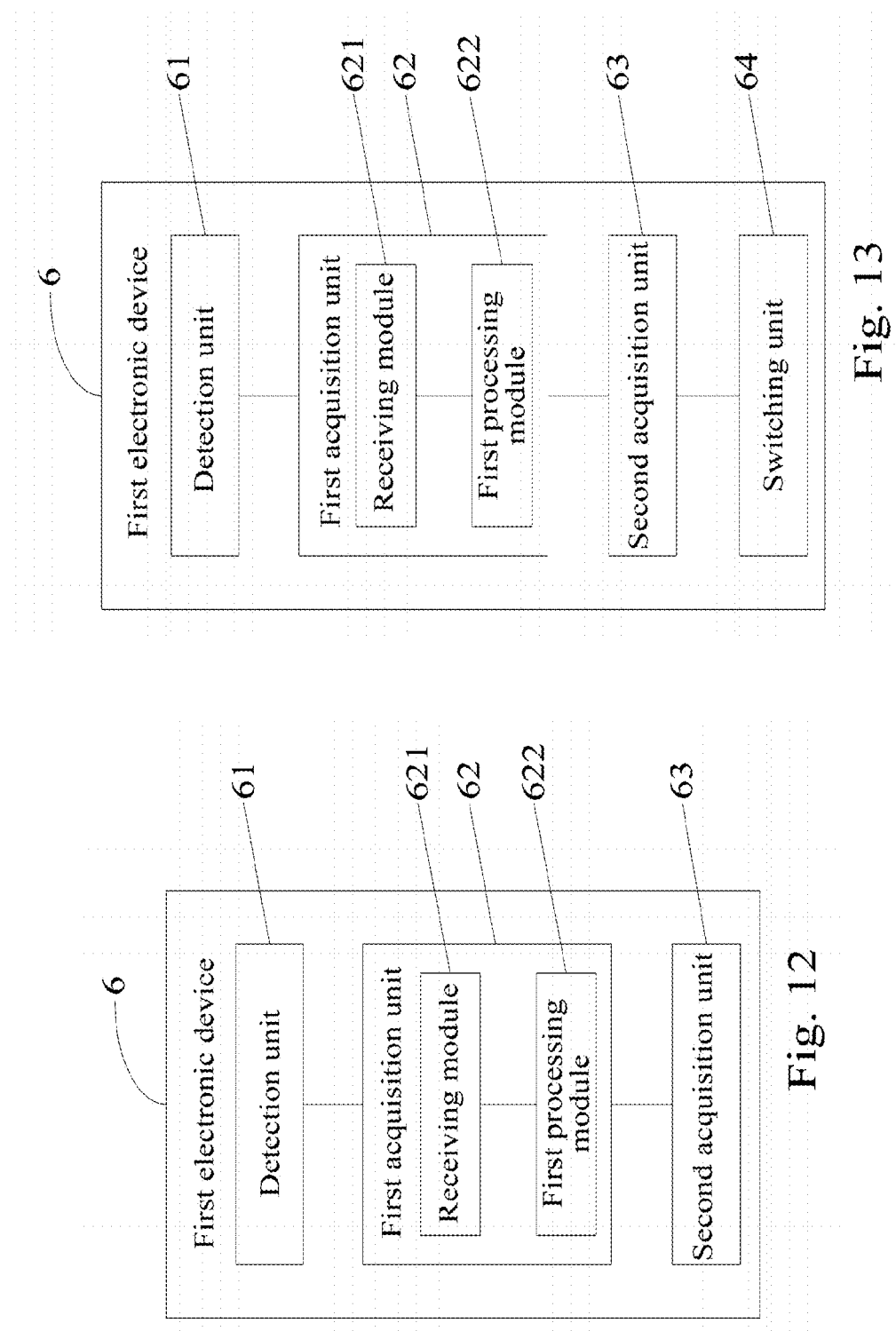
FIG. 12 shows a structure of yet another first electronic device provided in an embodiment of the present disclosure.
FIG. 13 shows a structure of a first electronic device provided in another embodiment of the present disclosure.

The second acquisition unit 63 may enable the device to stay in a first state in response to detecting that the first electronic device is not in the inserted state in the second electronic device. The first state may include a state of the first electronic device in response to the first electronic device not being in the inserted state in the second electronic device. In one embodiment, as shown in FIG. 12, the first acquisition unit 62 may include a receiving module 621 and a first processing module 622. The receiving module 621 may receive a start-up command sent by the second electronic device in response to the second electronic device detecting that the first electronic device is in the inserted state in the second electronic device. In one embodiment, second electronic device may generate the start-up command and transmit it to the first electronic device in response to the second electronic device identifying the first electronic device.

The first processing module 622 may switch the power supply of the first electronic device to the power-on state in response to the receiving module 621 receiving the start-up command to switch the first electronic device to the "on" state. In some embodiments, the first acquisition unit 62 may execute one or more of the following steps. In one embodiment, the first acquisition unit 62 may generate a power supply event in response to detecting that the first electronic device is in the inserted state in the second electronic device. In one embodiment, the first acquisition unit 62 may generate the start-up command in response to receiving the power supply event. The first acquisition unit 62 may switch a power supply of the first electronic device to the power-on state according to the start-up command to switch the first electronic device to the "on" state.

In some embodiments, as shown in FIG. 13, the first electronic device may include a switching unit 64. The switching unit 64 may switch the transmission bus of the first electronic device in response to the first electronic device not being in the "on" state to form a first signal connection between the first component of the first electronic device and the second electronic device via the transmission bus. The first signal connection may enable the first electronic device to enter the "on" state. The switching unit 64 may switch the transmission bus of the first electronic device in response to the first electronic device being in the "on" state to form a second signal connection with the second component of the first electronic device. The second signal connection may support signal transmission between the first electronic device and the second electronic device.

In one embodiment, the first electronic device may include a stick PC. The stick PC may include a similar stick PC as that described above. It should be noted that, the methods provided in the embodiments may be referred to one or more interaction processes between the units and modules of the electronic devices described herein.

In one embodiment, the detection unit 61, the first acquisition unit 62, the second acquisition unit 63, the switching unit 64, the receiving module 621 and the first processing module 622 may be implemented by using a central processing unit (CPU), a micro-processor unit (MPU), a digital signal processor (DSP), a field programmable gate array (FPGA), or the like in a wireless data transmission device. In one embodiment, one or more units described here may be implemented by the executable code stored in memory. In one embodiment, one or more units may be implemented using hardware and software.

A person skilled in the art should understand that, the embodiments of the present disclosure may be provided as a method, a system, or a computer program product. Therefore, the present disclosure may adopt the form of a hardware embodiment, a software embodiment, or an embodiment combining software and hardware. Moreover, the present disclosure may adopt the form of a computer program product implemented in one or more computer-usable storage media (including, but not limited to, magnetic disk memory, optical memory, and the like) containing computer-usable program codes.

The present disclosure is described herein with reference to flow diagrams and/or block diagrams of methods, devices, systems, and computer program products according to embodiments of the present disclosure. It should be understood that each process and/or block in the flow diagrams and/or block diagrams and a combination of processes and/or blocks in the flow diagrams and/or block diagrams may be implemented by using computer program commands. The computer program commands may be provided to a general computer, a dedicated computer, an embedded processor, or a processor of another programmable data processing device to generate a machine. The commands executed by the computer or the processor of the other programmable data processing device may generate an apparatus configured to implement functions designated in one or more processes in the flow diagrams and/or one or more blocks in the block diagrams.

Additionally or alternatively, the computer program commands may be stored in a computer readable memory that may guide the computer or the other programmable data processing devices to work in a specific manner. The commands stored in the computer readable memory may generate a product including a commanding apparatus. The commanding apparatus may implement functions designated in one or more processes in the flow diagrams and/or one or more blocks in the block diagrams.

In one embodiment, the computer program commands may be loaded to the computer or the other programmable data processing devices. A series of operational steps may be executed on the computer or the other programmable devices to generate computer implemented processing. Commands executed on the computer or the other programmable devices may provide the steps used to implement functions designated in one or more processes in the flow diagrams and/or one or more blocks in the block diagrams.

The above descriptions are merely preferred embodiments of the present disclosure, and are not intended to limit the protection scope of the present disclosure.

What is claimed is:

1. A method comprising:
    detecting whether a first electronic device is in an inserted state in a second electronic device;
    switching the first electronic device to an "on" state in response to detecting that the first electronic device is in the inserted state in the second electronic device;
    generating, at the first electronic device, a power supply event in response to detecting that the first electronic device is in the inserted state in the second electronic device; and
    transitioning a connection between the first electronic device and the second electronic device and internal to the first electronic device from a first connection to a second connection in response to the first electronic device switching to an "on" state,
    wherein, in response to the first electronic device switching to the "on" state, the first electronic device functions as a master device and the second electronic device functions as a slave device.

2. The method of claim 1, wherein detecting whether the first electronic device is in an inserted state in the second electronic device comprises detecting whether the first electronic device is in signal connection with a second electronic device.

3. The method of claim 1, further comprising enabling the first electronic device to remain in a first state in response to detecting that the first electronic device is not in the inserted state in the second electronic device, wherein the first state comprises the first electronic device not being in signal connection with the second electronic device.

4. The method of claim 1, wherein switching the first electronic device to the "on" state in response to detecting that the first electronic device is in the inserted state in the second electronic device comprises:
generating a start-up command;
sending the start-up command to the first electronic device; and
switching a power supply of the first electronic device to a power-on state.

5. The method of claim 1, wherein switching the first electronic device to the "on" state in response to detecting that the first electronic device is in the inserted state in the second electronic device comprises:
generating a start-up command in response to generating the power supply event; and
switching the power supply of the first electronic device to a power-on state in response to receiving the start-up command.

6. The method of claim 1, further comprising:
determining that the first electronic device is not in the "on" state;
switching a transmission bus of the first electronic device;
forming a first signal connection between a first component of the first electronic device and the second electronic device via the transmission bus;
switching the first electronic device to the "on" state;
switching the transmission bus of the first electronic device in response to the first electronic device being in the "on" state; and
forming a second signal connection between a second component of the first electronic device and the second electronic device, wherein the second signal connection comprises a signal transmission between the first electronic device and the second electronic device.

7. A first electronic device, comprising:
a detection unit that detects whether the first electronic device is in an inserted state in a second electronic device;
a processor;
a memory storing code executable by the processor, the code comprising code that:
switches the first electronic device to an "on" state in response to the detection unit detecting that the first electronic device is in the inserted state in the second electronic device; and
generates, at the first electronic device, a power supply event in response to the detection unit detecting that the first electronic device is in the inserted state in the second electronic device; and
a switching unit that transitions a connection between the first electronic device and the second electronic device and internal to the first electronic device from a first connection to a second connection in response to the first electronic device switching to an "on" state;

wherein, in response to the first electronic device switching to an "on" state, the first electronic device functions as a master device and the second electronic device functions as a slave device.

8. The first electronic device of claim 7, wherein the code further comprises code that detects a signal connection with the second electronic device.

9. The first electronic device of claim 7, wherein the code further comprises code that maintains the first electronic device in a first state in response to the detection unit detecting that the first electronic device is not in the inserted state in the second electronic device.

10. The first electronic device of claim 7, wherein the code further comprises code that:
receives a start-up command sent by the second electronic device in response to the second electronic device detecting that the first electronic device is in the inserted state in the second electronic device; and
switches a power supply of the first electronic device to a power-on state in response to receiving the start-up command.

11. The first electronic device of claim 7, wherein the code further comprises code that:
generates a start-up command in response to generating the power supply event; and
switches a power supply of the first electronic device to a power-on state in response to generating the start-up command.

12. The first electronic device of claim 7, further comprising a transmission bus, wherein the switching unit:
switches the transmission bus in response to the first electronic device not being in the "on" state;
forms a first signal connection between a first component of the first electronic device and the second electronic device via the transmission bus;
switches the first electronic device to the "on" state;
switches the transmission bus in response to the first electronic device being in the "on" state; and
forms a second signal connection between a second component of the first electronic device and the second electronic device, wherein the second signal connection comprises a signal transmission between the first electronic device and the second electronic device.

13. The first electronic device of claim 7, wherein the first electronic device comprises a stick PC.

14. The first electronic device of claim 7, wherein the first electronic device comprises an electronic device smaller than the second electronic device.

15. A program product comprising a non-transitory computer readable storage medium that stores code executable by a processor, the executable code comprising code to:
detect whether a first electronic device is in an inserted state in a second electronic device;
switch the first electronic device to an "on" state in response to detecting that the first electronic device is in the inserted state in the second electronic device;
generate, at the first electronic device, a power supply event in response to detecting that the first electronic device is in the inserted state in the second electronic device;
transition a connection between the first electronic device and the second electronic device and internal to the first electronic device from a first connection to a second connection in response to the first electronic device switching to an "on" state; and operate the first electronic device as a master device and operate the second electronic device as a slave device in response to the first electronic device being switched to the "on" state.

16. The program product of claim 15, wherein the code to detect whether the first electronic device is in the inserted state in the second electronic device comprises code to detect a signal connection between the first electronic device and the second electronic device.

17. The program product of claim 15, further comprising code to enable the first electronic device to remain in a first state in response to detecting that the first electronic device is not in the inserted state in the second electronic device, wherein the first state comprises the first electronic device not being in signal connection with the second electronic device.

18. The program product of claim 15, wherein the code to switch the first electronic device to the "on" state in response to detecting that the first electronic device is in the inserted state in the second electronic device comprises code to:
generate a start-up command;
send the start-up command to the first electronic device; and
switch a power supply of the first electronic device to a power-on state.

19. The program product of claim 15, wherein the code to switch the first electronic device to the "on" state in response to detecting that the first electronic device is in the inserted state in the second electronic device comprises code to:
generate a start-up command in response to generating the power supply event; and
switch a power supply of the first electronic device to a power-on state in response to receiving the start-up command.

20. The program product of claim 15, further comprising code to:
determine that the first electronic device is not in the "on" state;
switch a transmission bus of the first electronic device;
form a first signal connection between a first component of the first electronic device and the second electronic device via the transmission bus;
switch the first electronic device to the "on" state;
switch the transmission bus of the first electronic device in response to the first electronic device being in the "on" state; and
form a second signal connection between a second component of the first electronic device and the second electronic device, wherein the second signal connection comprises a signal transmission between the first electronic device and the second electronic device.

* * * * *